(No Model.)
P. GALES.
HARROW.
No. 320,773. Patented June 23, 1885.
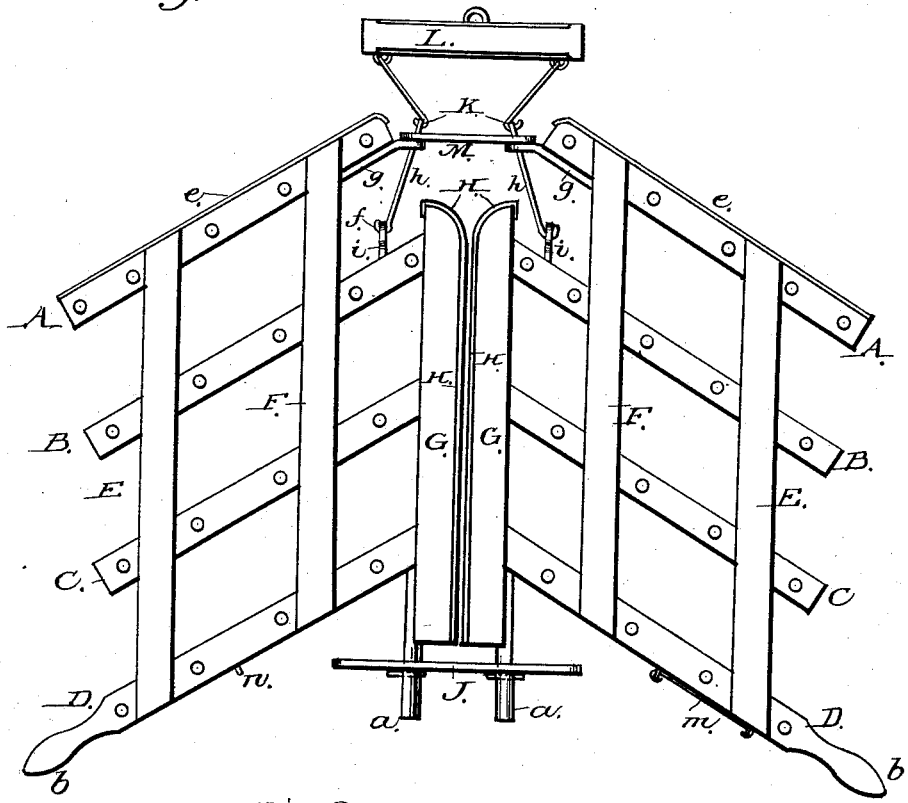
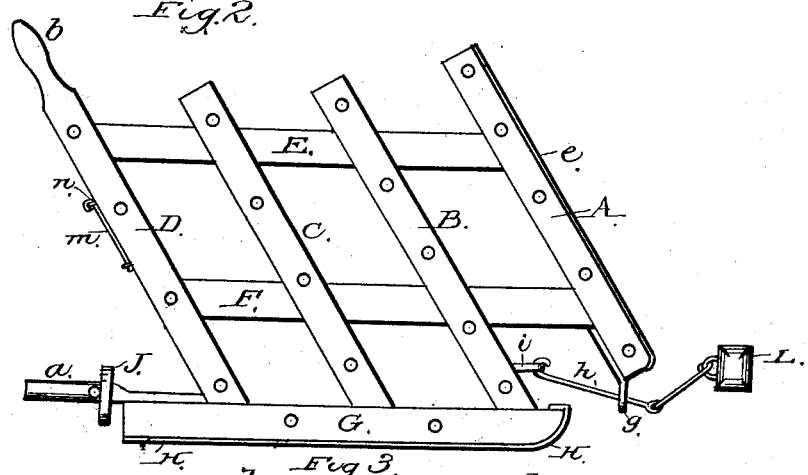
WITNESSES
P. Walter Fowler
H. B. Applewhaite
INVENTOR
Peter Gales
Per A. H. Evans & Co.
Attorneys

United States Patent Office.

PETER GALES, OF GILBERTSVILLE, IOWA.

HARROW.

SPECIFICATION forming part of Letters Patent No. 320,773, dated June 23, 1885.

Application filed April 3, 1885. (No model.)

*To all whom it may concern:*

Be it known that I, PETER GALES, a citizen of the United States, residing at Gilbertsville, in the county of Black Hawk and State of Iowa, have invented certain new and useful Improvements in Harrows, of which the following is a full, clear, and exact description, reference being had to the accompanying drawings, forming part of this specification, in which—

Figure 1 represents a plan view of a harrow embodying my improvements. Fig. 2 represents a side view of the harrow when folded. Fig. 3 represents a detail of the adjusting-bar.

My invention relates to sectional harrows provided with means whereby the same may be readily folded and transported; and it consists in the combination of devices hereinafter described and claimed.

To enable others skilled in the art to make and use my invention, I will now proceed to describe the exact manner in which I have carried it out.

The harrow consists, essentially, of two sections of similar construction having any desired number of beams, A, B, C, and D, secured together by longitudinal beams E and F, as shown in Fig. 1. The inner ends of the beams B, C, and D are connected together by beams G, which are faced with metallic strips H, and serve as runners for the harrow when the same has been folded and ready to be transported from the field. The rear of the beams G is provided with extensions $a$, which serve as handles to enable the operator to raise the inner sides of the sections to relieve the teeth of the accumulation of cornstalks or other rubbish with which they may be clogged. The beams B are also extended and provided with handles $b$, which enable the outer sides of the harrow to be raised in the same manner and for a like purpose.

J represents a plate which is slipped over the extensions $a$, and is provided with a series of perforations, $d$, which enable the sections of the harrow to be brought close together or be moved farther apart, as desired. This is an important feature, as the teeth $c$, which are secured in the harrow-beams in the usual manner, may be shifted so as to bring them in line or directly behind each other, which leaves the ground thoroughly drilled; or they may be arranged out of line with each other, which is necessary when ordinary harrowing is being done.

The runner-beams G do not extend to the front of the harrow, and therefore have no direct connection with the beams A, although these beams are firmly connected with the beams B, C, and D by the connecting-beams E and F, as shown in Fig. 1.

The beams A may also be used as runners, and they are provided with metallic plates $e$, while the forward ends of both beams A and G are rounded, to prevent their catching in the ground when the harrow has been folded and is being transported.

Secured to the beams A are the plates $g$, perforated to receive the rod $h$, the rear end of said rod being provided with a hook, $f$, which engages a loop, $i$, on the beams B, the opposite end of the rod terminating in an eye, K, to which may be attached the single or double tree L, thereby connecting the two sections of the harrow together, and also furnishing means for attaching the team. By this construction the strain or draft is upon the beams, which are rigidly connected to the runner-beams G, and the sections are held steadily to the work by the shaft-rods $h$, passing through the plates on the front beams, $a$—an essential feature in my improvement.

A bar, M, engages the rods $h$ and connects the two sections together at their front.

Upon the rear of one of the sections is a hook, $m$, adapted to engage an eye, $n$, on the other section, thereby securing the sections when the harrow has been folded and is ready for transportation.

Having thus described my invention, what I claim as new, and desire to secure by Letters Patent, is—

In a sectional harrow, the beams B, C, and D, the latter having handles $b$, in combination with the runners G, to which the beams are attached, handles $a\ a$, for raising the harrow at the center, the front beams, A, sustained by the connecting-beams F, the plates $g$, secured to the beams A, and a means whereby the strain or draft is borne upon those beams which are secured to the runner-beams, substantially as herein described.

PETER GALES.

Witnesses:
J. P. KIEFFER,
J. M. WALKER.